(12) United States Patent
Kevadiya et al.

(10) Patent No.: US 12,306,151 B2
(45) Date of Patent: May 20, 2025

(54) PREDICTIVE CHROMATOGRAPH PEAK DETECTION

(71) Applicant: Halliburton Energy Services, Inc., Houston, TX (US)

(72) Inventors: Jhanvi Manishkumar Kevadiya, Houston, TX (US); Mathew Dennis Rowe, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 238 days.

(21) Appl. No.: 18/075,177

(22) Filed: Dec. 5, 2022

(65) Prior Publication Data
US 2024/0183829 A1 Jun. 6, 2024

(51) Int. Cl.
*G01N 30/86* (2006.01)

(52) U.S. Cl.
CPC ..... *G01N 30/8679* (2013.01); *G01N 30/8668* (2013.01)

(58) Field of Classification Search
None
See application file for complete search history.

(56) References Cited

U.S. PATENT DOCUMENTS

| | | |
|---|---|---|
| 5,827,946 A | 10/1998 | Klee et al. |
| 8,628,977 B2 | 1/2014 | Adamec et al. |
| 9,640,374 B2 | 5/2017 | Oliphant et al. |
| 11,237,101 B2* | 2/2022 | Wyatt ............ G01N 21/3504 |
| 2014/0274751 A1 | 9/2014 | Sadowski et al. |

(Continued)

FOREIGN PATENT DOCUMENTS

| | | |
|---|---|---|
| CN | 104297504 A | 1/2015 |
| CN | 109239247 A | 1/2019 |

(Continued)

OTHER PUBLICATIONS

International Search Report & Written Opinion; PCT Application No. PCT/US2022/052010; mailed Aug. 28, 2023.

(Continued)

*Primary Examiner* — Daniel S Larkin
(74) *Attorney, Agent, or Firm* — NOVAK DRUCE CARROLL LLP

(57) ABSTRACT

Described herein are systems and techniques for improving operation of a gas chromatograph or a computer that identifies compounds that correspond to peaks in a graph of gas chromatograph data (chromatogram). Each of the peaks included in the chromatogram may be associated with retention times that are measured amounts of time that correspond to how long it took for respective compounds included in a sample to move through the gas chromatograph. Measured retention times may be compared to standard retention times to identify retention time shifts. These retention times shifts may correspond to a function that may be used to predict retention times of other compounds that could be included in the sample. When a measured retention time that is associated with an unclassified peak in the chromatogram matches a predicted retention time of a specific compound to a threshold level, the unclassified peak may be identified the specific compound.

20 Claims, 7 Drawing Sheets

(56) References Cited

U.S. PATENT DOCUMENTS

| | | | | |
|---|---|---|---|---|
| 2014/0309946 | A1* | 10/2014 | Kono | G01N 30/8675 702/24 |
| 2016/0047782 | A1 | 2/2016 | Sadowski et al. | |
| 2018/0024101 | A1* | 1/2018 | Srinivasan | G01N 30/8668 73/1.02 |
| 2020/0096489 | A1* | 3/2020 | Ivosev | G01N 30/72 |

FOREIGN PATENT DOCUMENTS

| | | |
|---|---|---|
| JP | 4507962 B2 | 7/2010 |
| WO | 03092869 A1 | 11/2003 |
| WO | 2012126451 A2 | 9/2012 |
| WO | 2018083334 A1 | 5/2018 |

OTHER PUBLICATIONS

English abstract of JP4507962; Retrieved from www.espacenet.com on Aug. 29, 2023.

English abstract of CN109239247; Retrieved from www.espacenet.com on Aug. 29, 2023.

English abstract of CN104297504; Retrieved from www.espacenet.com on Aug. 29, 2023.

Boswell, Paul G. et al., "Easy and accurate calculation of programmed temperature gas chromatographic retention times by back-calculation of temperature and hold-up time profiles", Journal of Chromatography A; 1263 (2012) 179-188; Sep. 23, 2012.

Mazur, D.M. et al., "Regression algorithm for calculating second-dimension retention indices in comprehensive two-dimensional gas chromatography", Journal of Chromatography A; 1569 (2018) 178-185; Jul. 24, 2018.

Kováts, E., "Gas-chromatographische Charakterisierung organischer Verbindungen. Teil 1: Retentionsindices aliphatischer Halogenide, Alkohole, Aldehyde und Ketone", Helvetica Chimica Acta, 41, 1915-1932. Volume 41, Issue 7; pp. 1915-1932; 1958.

Van Den Dool, H. et al., "A Generalization of the Retention Index System Including Linear Tempeature Programed Gas-Liquid Partition Chromatography", Journal of Chromatography A; vol. 11, 1963, pp. 463-47; 1963.

* cited by examiner

PREDICTIVE CHROMATOGRAPH PEAK DETECTION

TECHNICAL FIELD

The present disclosure is generally directed to improving operation of a chromatograph. More specifically, the present disclosure is directed to detecting compounds that are located between known compounds when environmental conditions of a wellbore vary.

BACKGROUND

When managing oil and gas drilling and production environments (e.g., wellbores, etc.) and performing operations in the oil and gas drilling and production environments, it is important to obtain and test samples of materials that have been obtained when a wellbore is drilled. When such samples are tested in a gas chromatograph, a graph that includes various peaks is typically generated. Such a graph is commonly referred to as a chromatogram and each peak included in the chromatogram is associated with a particular time that is referred to as a retention time. Each respective retention time in a chromatogram relates to how long it takes for a respective compound to move from an input of the chromatograph, through a column of the gas chromatograph, to a detector of the gas chromatograph. Variables that may be associated with a particular sample or a condition of the gas chromatograph may result in peaks included in the chromatogram being offset from an ideal or standard location. Such variables can make the task of identifying a compound that corresponds to a particular peak included in the chromatogram. As such, variables can make it difficult to identify certain compounds that are included in a chromatogram.

BRIEF DESCRIPTION OF THE DRAWINGS

In order to describe the manner in which the features and advantages of this disclosure can be obtained, a more particular description is provided with reference to specific implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Figure 1A:
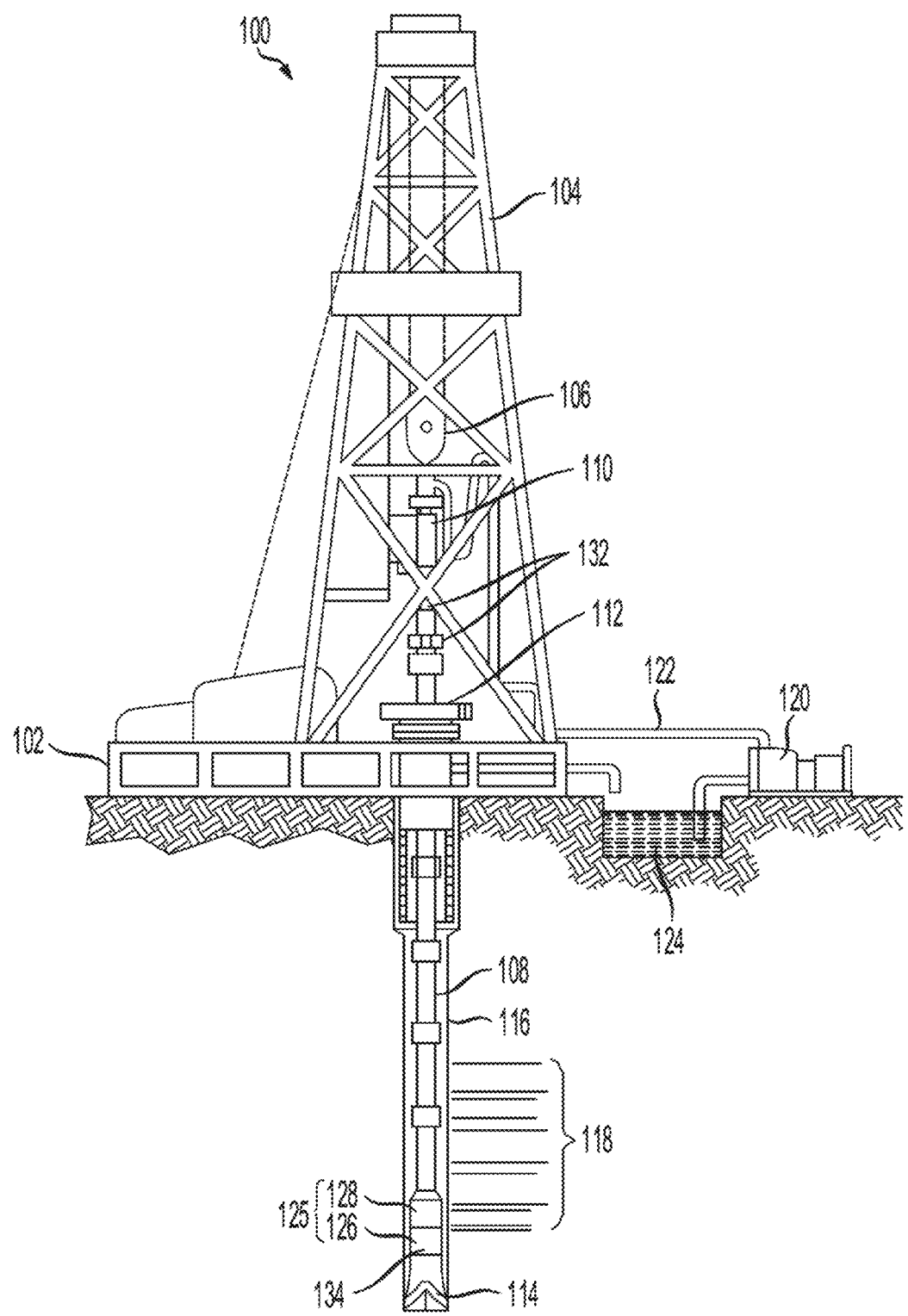
FIG. 1A is a schematic diagram of an example logging while drilling wellbore operating environment, in accordance with various aspects of the subject technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous compounds. In addition, numerous specific details are set forth in order to provide a thorough understanding of the methods and apparatus described herein. However, it will be understood by those of ordinary skill in the art that the methods and apparatus described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the present disclosure.

Described herein are systems and techniques for improving operation of a gas chromatograph or a computer that identifies compounds that correspond to peaks in a graph of gas chromatograph data (chromatogram). Each of the peaks included in the chromatogram may be associated with retention times that are measured amounts of time that correspond to how long it took for respective compounds included in a sample to move through the gas chromatograph. Measured retention times may be compared to standard retention times to identify retention time shifts. These retention times shifts may correspond to a function that may be used to predict retention times of other compounds that could be included in the sample. When a measured retention time that is associated with an unclassified peak in the chromatogram matches a predicted retention time of a specific compound to a threshold level, the unclassified peak may be identified as being the specific compound.

Analysis performed by a gas chromatograph may not be consistent when conditions associated with assayed materials change. Gas chromatographs are used to identify materials located in a sample of materials. A gas chromatograph includes a first input into which a sample of a set of compounds are input and a second input into which an inert gas is input. Heat is applied to the sample and at least some of the compounds included in the set of materials are typically vaporized where other compounds included in the set of compounds may not vaporize or may vaporize more slowly than other compounds during this heating process. The inert gas provided to the second input helps to push the vaporized compounds through a tube that is commonly referred to as a column of the gas chromatograph. Frequently, the column is coated with a material that is referred to as "stationary phase" or "liquid phase." The compounds that are vaporized during this process are referred to as being a "gas phase." Initially, lighter compounds included in the sample are vaporized before heavier compounds that are included in the sample. Compounds that vaporize first pass through the column before compounds that vaporize later. An output of the column is connected to a sensor that is referred to as a detector and an output of the detector is provided to a computer that may produce a graph of a test result that is referred to as a chromatogram. Lighter vaporized compounds reach the detector before (faster than) heavier vaporized compounds.

When the detector senses the presences of a compound, a quantity of that compound included in the sample will cause the detector to generate an output that corresponds to the quantity of the compound that has been detected. The greater the quantity of a particular detected compound will correspond to a higher-level signal being output from the detector. The level of a quantity of a detected compound is referred to as an intensity and outputs for each respective compound included in a sample may be associated with respective peaks included in a chromatogram. A chromatogram of the set of compounds will include a horizontal axis of time and a vertical axis of intensity. In an instance when a sample includes 80% n-Hexane and 20% n-Heptane are passed into the first input of the gas chromatograph, the detector will detect an intensity of n-Hexane first after which the detector will detect an intensity of n-Heptane. The n-Hexane is detected first because n-Hexane is lighter than n-Heptane. This means that the n-Hexane evaporates before the n-Heptane. Since the sample includes 80% n-Hexane and 20% n-Heptane, the intensity of the n-Heptane will be about four times higher than the intensity of the n-Hexane in the chromatogram. Since n-Hexane vaporizes faster than n-Hexane, a peak associated with the n-Hexane will appear in the chromatogram before a peak associated with the n-Heptane. When this test is repeated with a same set of operating conditions and materials, times associated with the n-Hexane peak and the n-Heptane peak should be repeatable (within a threshold level). Under ideal conditions, one might expect these peaks to be perfectly repeatable, in real world conditions, however, variations from sample to sample, variations in the operation of the gas chromatograph, or because of other variations, times where peaks of detected materials may vary to some extent. Times where peaks appear in a chromatogram graph are commonly referred to as retention times.

Things that can affect operation of a gas chromatograph include a polarity of the liquid phase material or of the sample, a temperature of the sample, a temperature at a gas chromatograph, a temperature change or ramp, a pressure, and a pressure change or ramp. In certain instances, variations in chromatograms may make it difficult to precisely differentiate one compound from another. In order to improve operation of a gas chromatograph, what are needed are new methods and apparatus that can account for shifts in the retention times of detected compounds that are caused by one or more of the variations discussed above.

Described herein are systems, apparatuses, processes (also referred to as methods), and computer-readable media (collectively referred to as "systems and techniques") for improving operation of a gas chromatograph. Such systems and techniques may focus on detecting compounds that include a number of carbon atoms (C), for example, compounds that include between six carbon atoms (C6) and eight carbon atoms (C8) and that may also include some number Hydrogen atoms. Materials that may be detected by such apparatus may include hydrocarbons or alkanes. Molecules of each respective alkane/hydrocarbon include different numbers of specific types of atoms (e.g. carbon or hydrogen). The alkane n-Hexane that has six carbon atoms and fourteen Hydrogen atoms (C6H14), Benzene that has six carbon atoms and six hydrogen atoms (C6H6), and n-Heptane that has seven carbon atoms and sixteen hydrogen atoms (C7H16). Table 1 illustrates the chemical formula for n-Hexane, Benzene, and n-Heptane and Table 1 cross-references a vaporization temperature (or boiling point) at atmospheric pressure and molecular mass of n-Hexane, Benzene, and n-Heptane.

TABLE 1

Compound Chemical Formula, Vaporization Temperature, and Molecular Mass Cross-Reference

| Compound | n-Hexane | Benzene | n-Heptane |
|---|---|---|---|
| Chemical Formula | C6H14 | C6H6 | C7H16 |
| Boiling/Vaporization Temperature in Degrees Celsius (C.) | 69 | 80.85 | 99.45 |
| Molecular Mass grams/Mol | 86.17536 | 78.1118 | 100.2019 |

Table 1 also shows that n-Hexane has a boiling point or vaporization temperature of 69 degrees Celsius C and a molecular mass of 86.17356 grams/Mol, that Benzene has a boiling point or vaporization temperature of 80.85 C and a molecular mass of 78.118 grams/Mol, and that n-Heptane has a boiling point or vaporization temperature of 99.45 C and a molecular mass of 100.2019 grams/Mol. Note that the vaporization temperature of n-Hexane is lowest, that the vaporization temperature of Benzene is higher than n-Hexane, and that the vaporization temperature of n-Heptane is higher than Benzene. This means that when a sample that includes these three compounds, a peak associated with n-Hexane will appear first, a peak associated with Benzene will appear second, and a peak associated with n-Heptane will appear last in a chromatogram of that sample.

As mentioned above, based on variations of materials or other factors (e.g., polarity, a temperature, a temperature change or ramp, a pressure, and a pressure change or ramp) may affect retention times in a chromatogram. In order to compensate for variations retention times (in timing where these peaks are located), one or more factors may be compensated when compounds included in a sample are identified. Each of a set of factors may be evaluated when estimates for retention times of compounds that may be included in the chromatogram graph are calculated. An increase in temperature, for example, may result in compounds included in a sample being vaporized more rapidly and this may result in retention times of compounds reducing as compared to gas chromatograph runs being performed with a lower temperature. Each time samples are run through the gas chromatograph, variations in a set of factors may affect retention times included in a chromatogram. In instances when variations of specific factors from gas chromatograph run to run are expected, functions associated with those run-to-run variations may be used to estimate changes in retention times. An increase in temperature or temperature ramp or reduction in pressure or pressure ramp may each contribute to reductions in retention times included in a chromatogram graph of a most recent gas chromatograph run as compared to retention times included in a chromatogram graph of a previous gas chromatograph run.

Functions used to identify compounds that are associated with certain peaks in a chromatogram may be selected based on conditions associated with a run of the gas chromatograph. For example, when a temperature at the gas chromatograph is constant (e.g., an isothermal condition) functions consistent with a Kovats index and/or a Van Der Dool and Kratz index may be used identify retention times of currently unidentified or unclassified compounds included in a chromatogram relative to retention times of one or more reference compounds. This may include performing linear or logarithmic interpolations. These functions may be used to interpolate locations of peaks included in a chromatogram relative to peaks of compounds listed in the NIST database. For example, the use of functions associated with a Kovats index may be used temperatures within the gas chromatograph are constant. As such, a Kovats index may be calculated when conditions of a gas chromatograph are isothermal. Equations used to calculate a Kovats index for particular hydrocarbons or alkanes may be linear or logarithmic and these calculations may be used to estimate a retention time of a peak for a specific known compound. When a retention time of an unclassified peak that is included in a chromatogram matches (within a threshold margin) the estimated retention time of a specific compound, the unclassified peak may then be classified as the specific compound.

Formula 1 is a linear equation that calculates a Kovats index when linear interpolations are used to associate unclassified peaks in a chromatogram with specific compounds. Formula 2 to is a logarithmic equation that calculates a Kovats index when logarithmic interpolations are used to associate the unclassified peaks in the chromatogram with specific compounds.

Linear Kovats Index Equation $$I_u = \left[\frac{t_{r,u} - t_{r,n}}{t_{r,N} - t_{r,n}}\right][100(N - n)] + 100n \qquad \text{Formula 1}$$

Formula 1 calculates a Kovats index "Iu" for an unclassified compound where n is a number of carbon atoms of a first alkane (hydrocarbon compound), and N is a number of carbon atoms for a second alkane. Here "tr,u" is a retention time for an unclassified peak in a chromatogram, "tr,n" is a retention time associated with the first alkane, and "trN" is a retention time associated with the second alkane. Kovats indices may be calculated for various different known compounds and these Kovats indices may be compared to a calculated Kovats index for an unclassified peak. When a chromatogram includes peaks that correspond to reference compounds like n-Hexane and n-Heptane, retention times associated with these reference compounds may be compared to retention times listed in the NIST database. Differences in measured retention times of reference compounds and retention of times of those compounds listed in the NIST database may be indicative of shifts in retention times of other compounds. Such differences may also correspond to changes in Kovats indices calculated for various compounds. Differences in Kovats indices may then be used to interpolate where peaks of specific known compounds could appear in the chromatogram. Actual peaks included in the chromatogram may then be associated with specific compounds based on comparisons of Kovats indices when the conditions of the chromatograph are isothermal.

Formula 2 illustrates a different form of an equation used to calculate Kovats indices. Formula 2 may be applied when logarithmic interpolations are performed. Formula 2 includes Kovats index "I" where "n" represents a number of carbon atoms included in respective alkanes, "tr,x" is a retention time of an unknown or unclassified compound, and "tr, n" and "tr, n+1" are adjusted retention times of compounds included in a chromatogram.

Logarithmic Kovats Index Equation $$I = \left[100 + 100\frac{\log(t_{r,x}) - \log(t_{r,n})}{\log(t_{r,n+1}) - \log(t_{r,n})}\right] \qquad \text{Formula 2}$$

Other functions that may be used to identify unknown or unclassified compounds include regression algorithms and least means squared evaluations. For example, a regression algorithm may be used when conditions of a gas chromatograph correspond to a ramp in temperature. This may include calculating retention values in the form of index values and identifying a correlation coefficient that corresponds to specific retention index values and measured retention times. These specific index values may be calculated using equations similar to the Kovats index equations discussed above or may be calculated using other equations. A scatter plot that includes respective points where each point corresponds to a respective measured retention time and a specific retention index may then be generated. A line may then be fit to the data points included in the scatter plot. Any data point that lies within a threshold distance of a data point of a specific known compound fitted to the line may then be associated with that specific compound.

Functions used by methods of the present disclosure are not limited to the equations or regression approaches discussed above as any function that corresponds to a condition that may affect locations of a peak in a chromatogram may be used. Sensor measurements may be used to identify temperatures and/or pressures of a gas chromatograph when a condition to associate with a run of the gas chromatograph is identified. Such sensor measurements may be used to identify an isothermal condition, a temperature ramp condition, a pressure ramp condition, or a pressure and/or temperature change condition within the gas chromatograph. Functions that correspond to an identified condition may be used to associate a peak in a chromatogram with a specific compound.

Before a particular peak in a chromatogram is identified, it may be classified as an "unknown compound" or "unclassified compound." These functions may be used to identify "unclassified compounds" based on variance in a retention time compared to variations in retention times of reference alkanes that vaporize or elute before and after the unknown compound. These functions may be used to predict a shift in a retention time of an unknown alkane based on shifts in peaks attributed to the presence of n-Hexane and n-Heptane. An increase in temperature or decrease in pressure may result in a reduction of retention times of compounds included in a sample as compared to retention times associated with a lower temperature or higher pressure.

Systems and techniques of the present disclosure may identify retention times for all compounds that can be eluted between two specific alkanes (e.g., between n-Hexane and N-Heptane). Retention times associated with peaks included in a gas chromatograph may be compared to retentions times that were predicted based on evaluating retention times attributed to the presence of n-Hexane and n-Heptane in a sample. When a retention time of a chromatogram peak matches a retention time associated with an alkane that elutes between n-Hexane and n-Heptane according to a prediction function, a compound associated with the gas chromatograph peak may be identified. Here again, this may be determined based on a predicted shift in retention time relative to shifts in retention times of n-Hexane and n-Heptane when a first sample was run through a chromatogram as compared to one or more standard retention times. The National Institute of Standards and Technology (NIST) of the United States Department of Commerce publishes data that identifies standard retention times of various compounds, including alkanes. Alternatively, or additionally, run to run retention time changes and other variables may also be identified when techniques of the present disclosure are performed.

FIG. 1A is a schematic diagram of an example logging while drilling wellbore operating environment, in accordance with various aspects of the subject technology. The drilling arrangement shown in FIG. 1A provides an example of a logging-while-drilling (commonly abbreviated as LWD) configuration in a wellbore drilling scenario 100. The LWD configuration can incorporate sensors (e.g., EM sensors, seismic sensors, gravity sensor, image sensors, etc.) that can acquire formation data, such as characteristics of the formation, components of the formation, etc. For example, the drilling arrangement shown in FIG. 1A can be used to gather formation data through an electromagnetic imager tool (not shown) as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission (e.g., using mud pulse telemetry, EM telemetry, or acoustic telemetry). In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
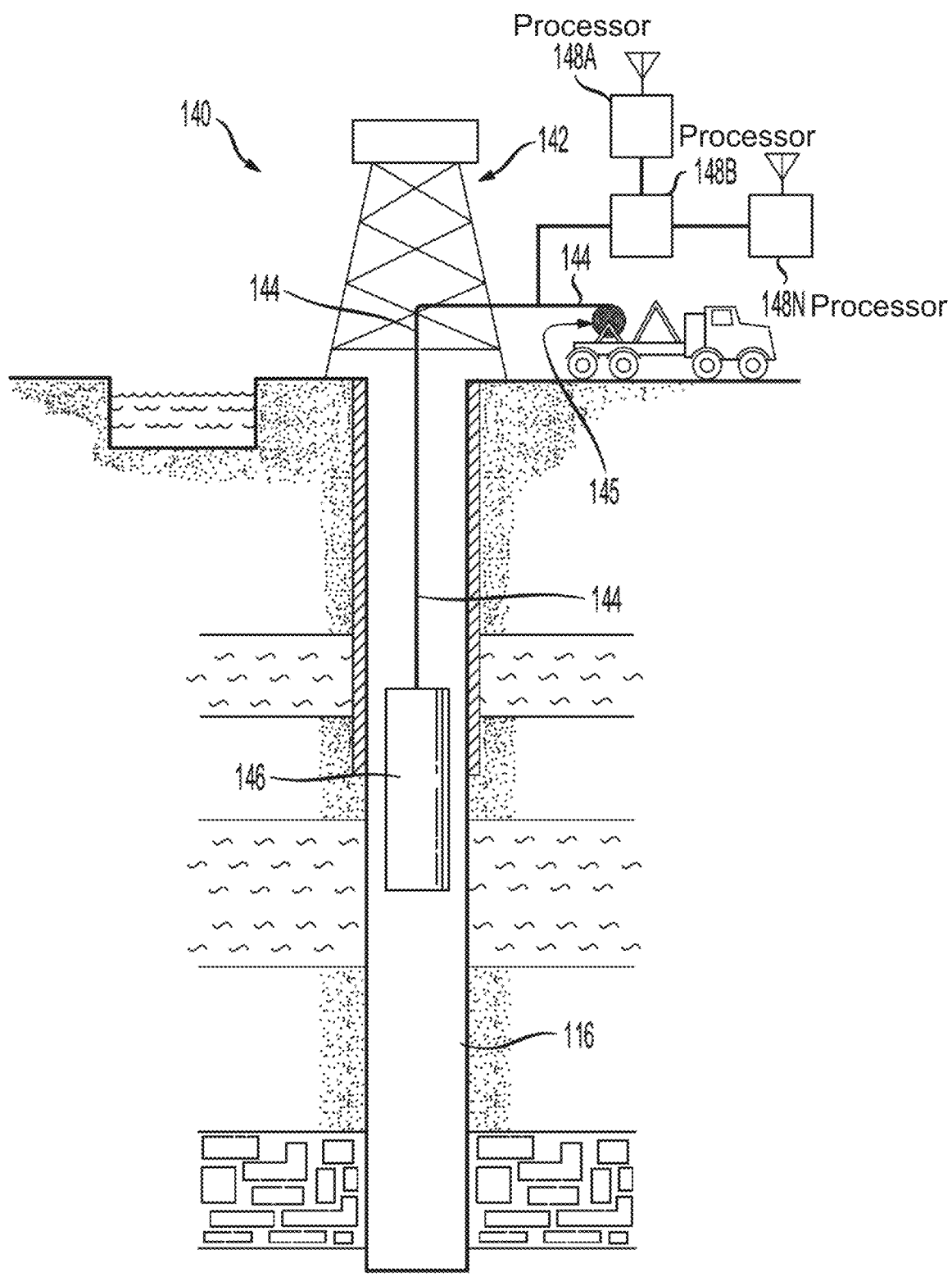
FIG. 1B is a schematic diagram of an example downhole environment having tubulars, in accordance with various aspects of the subject technology.

FIG. 1B is a schematic diagram of an example downhole environment having tubulars, in accordance with various aspects of the subject technology. In this example, an example system 140 is depicted for conducting downhole measurements after at least a portion of a wellbore has been drilled and the drill string removed from the well. An electromagnetic imager tool (not shown) can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

Figure 2:
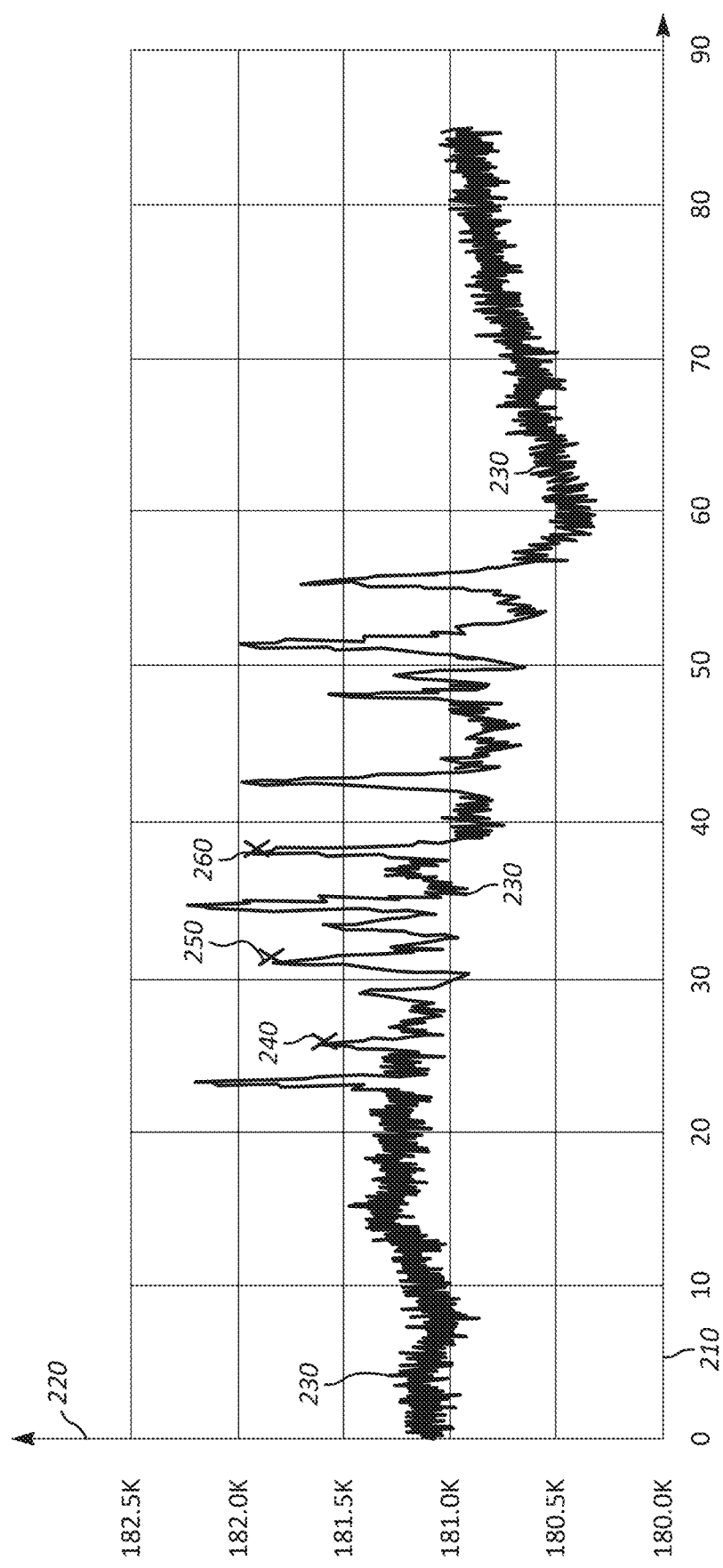
FIG. 2 illustrates an example of a graph, commonly referred to as a chromatogram, output by a computer that receives data from a detector of a gas chromatograph after a sample has been introduce into an input of the gas chromatograph, in accordance with various aspects of the subject technology.

FIG. 2 illustrates an example of a graph, commonly referred to as a chromatogram, output by a computer that receives data from a detector of a gas chromatograph after a sample has been introduced into an input of the gas chromatograph. FIG. 2 includes horizontal axis 210 and vertical axis 220. Horizontal axis 210 includes measurements of time ranging from 0 seconds to 90 seconds and vertical axis 220 includes values of detections detected by a detector of the gas chromatograph. The detention values of vertical axis 220 range from 180 thousand (K) detections to 182.5 K detections. Curve 230 of FIG. 2 includes several peaks that correspond to compounds detected by the detector of the gas chromatograph. A retention time of peak 240 occurs at 25.818 seconds, a retention time of peak 250 occurs at 31.122 seconds, and a retention time of peak 260 occurs at 38.38 seconds. In an example, retentions times of peaks 240 and 260 may correspond to respectively known alkanes of n-Hexane and n-Heptane. In this example, peak 250 indicates the presence of an unclassified alkane. Systems and techniques of the present disclosure may estimate retention times for all alkanes that exist between retention times of n-Hexane and n-Heptane. In an instance when an estimated retention time for Benzene equal 31.122 seconds plus or minus a threshold time interval, the unknown alkane may be identified as Benzene.

Figure 3:
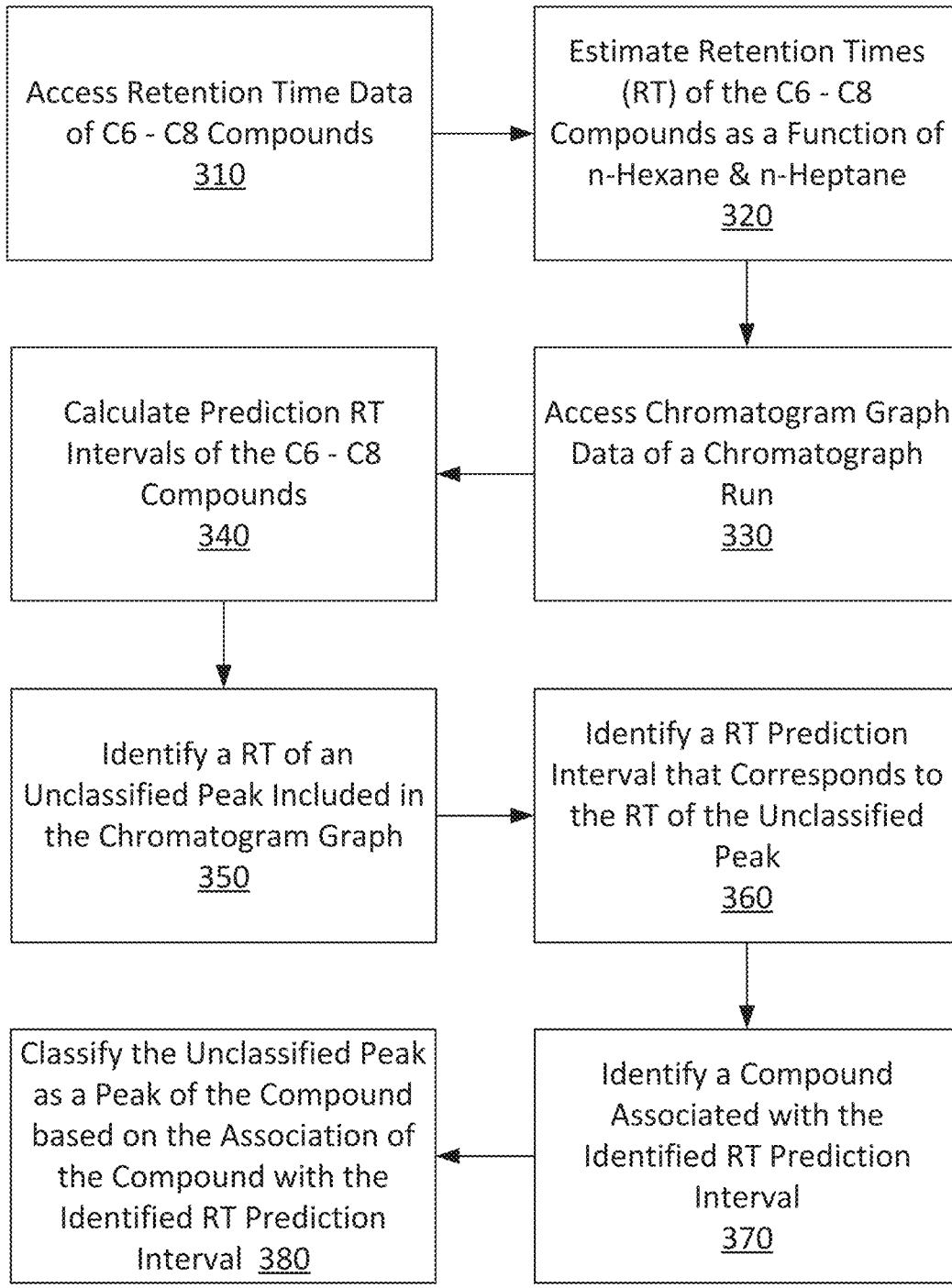
FIG. 3 illustrates a flowchart of an example process for identifying compounds associated with unclassified compounds included in a chromatogram, in accordance with various aspects of the subject technology, in accordance with various aspects of the subject technology.

FIG. 3 is a flowchart illustrating an example process for improving the operation of a gas chromatograph. Block 310 of FIG. 3 is where retention time data associated with alkane compounds that include between six and eight carbon atoms in a molecule. Examples of such alkane compounds (hydrocarbons) include n-Hexane, Benzene, and n-Heptane. This may include accessing a database that stores information regarding all known alkane compounds that have vaporization temperatures between n-Hexane and n-Heptane. This data may include standard retention times associated with the vaporization of alkanes that are identified in National Institute of Standards and Technology (NIST) provided by the United States Department of Commerce. The data accessed at block 310 may include data that identifies a first standard retention time of a first reference compound, a standard retention time of a second reference compound, and standard retention time of one or more other known compounds. In such an instance, n-Hexane and n-Heptane may respectively be the first and the second reference compound. Alternatively, or additionally, retention time values associated with a previous gas chromatography test of a sample that includes n-Hexane and/or n-Heptane may be accessed.

At block 320, estimated retention times associated with n-Hexane and n-Heptane may be identified. This estimate may be based on knowledge of something that affects operation of a gas chromatograph. For example, knowledge of a polarity of the liquid phase material, a temperature of the sample, a temperature at a gas chromatograph, a temperature change or ramp associated with the gas chromatograph, a pressure at the gas chromatograph, and/or a pressure change or ramp within the gas chromatograph may each be used to predict changes in locations of retention times in a particular chromatogram. In certain instances, such temperatures, pressures, or polarity may be monitored by sensors at the gas chromatograph. In an instance, when multiple sensors are used, temperature and/or pressure changes in different areas of the gas chromatograph may be monitored. When collected temperature and/or pressure data indicate differences in temperatures and/pressures from one test run to another test run of the gas chromatograph, this data may be used to predict whether retention times of compounds within a test sample are likely shifted in time relative to values listed in the NIST standard or from run to run of the gas chromatograph. Similarly, the polarity of the liquid phase of the gas chromatograph column may be monitored using one or more sensors.

Block 330 of FIG. 3 is where data included in a chromatogram may be accessed. The data accessed in block 330 may be data of a most recent test of a sample run through the chromatogram. Locations of peaks in the chromatogram may be identified at block 330. This may include associating each peak in the chromatogram with a particular retention time.

At block 340, retention time prediction intervals for various compounds likely to be included in the sample (e.g., any compound that includes between six and eight carbon atoms per molecule) may be estimated or calculated. Such estimates may be made based on identifying shifts in retention times of peaks in the chromatogram that likely attributed to the presence of n-Hexane and/or n-Heptane in the sample. Differences in retention times associated with the presence of n-Hexane and/or the n-Heptane in the sample may be indicative of differences in retention times of other compounds that are included in the sample. For example, in an instance when an unclassified compound that has a vaporization temperature closer to n-Hexane than n-Heptane and when the retention time attributed to n-Hexane in the chromatogram is less than the retention time of n-Hexane listed in the NIST standard, a likelihood that the unclassified compound also has a lower retention time in the chromatogram may be increased. Since changes in retention times based on known or unknown variables may be non-linear, multiple different prediction functions may be implemented to identify different sets of different prediction values. Each respective set of the different sets of prediction values may identify predicted retention times for all materials that vaporize in a range of temperature and/or pressure values. Each predicted retention time may also be associated with a difference threshold. A prediction interval associated with a particular compound may include a predicted retention time and the difference threshold. In certain instances, different thresholds may be used for different peaks included in a chromatogram and these thresholds may span an amount of time (e.g., seconds or fractions of seconds). Alternatively, or additionally, these predicted retention times may be estimated using data collected when the gas chromatograph test was run. Here again, this collected data may identify a polarity of the liquid phase material or of the sample, a temperature of the sample, a temperature at a gas chromatograph, a temperature change or ramp, a pressure, and a pressure change or ramp. When calculations are performed, a processor executing instructions out of a memory may implement a function according to an equation that may be associated with the functions described above or with other functions used to match measured retention times with estimated retention times of specific compounds.

At block 350 a retention time of an unclassified peak included in a chromatogram may be identified from the data accessed in block 330. An evaluation may be performed at block 360 that identifies prediction intervals for all compounds that have vaporization temperatures between the vaporization temperatures of two reference alkanes (e.g., between the vaporization temperatures of n-Hexane and n-Heptane). Block 360 may also identify that a retention time prediction interval that corresponds to a retention time prediction interval of the unclassified peak. Block 370 may identify a compound associated with the corresponding prediction interval. In an instance when reference retention times of n-Hexane, Benzene, and n-Heptane for are respectively 28.818 seconds, 31.122 seconds, and 38.280 seconds and that in a test run of a sample has a retention time of n-Hexane of 28.500 seconds and a retention time of n-Hexane and 38.180 seconds, a predicted retention time for Benzene may be estimated to be 38.03 seconds plus or minus 0.400 seconds. Any peak located in a gas chromatograph of this sample run that is located between 37.630 seconds and 38.430 may be classified as belonging to Benzene. In this manner the unclassified peak may be classified as being a peak of the compound Benzene at block 380, for example. While the two reference compounds discussed above are n-Hexane and n-Heptane, other or additional reference compounds may be used by systems and techniques of the present disclosure. For example, reference compounds may include two or more of Methane (CH4), Pentane (C5H12), n-Hexane (C6H14), n-Heptane (C6H6), or Octane (C6H18).

Figure 4:
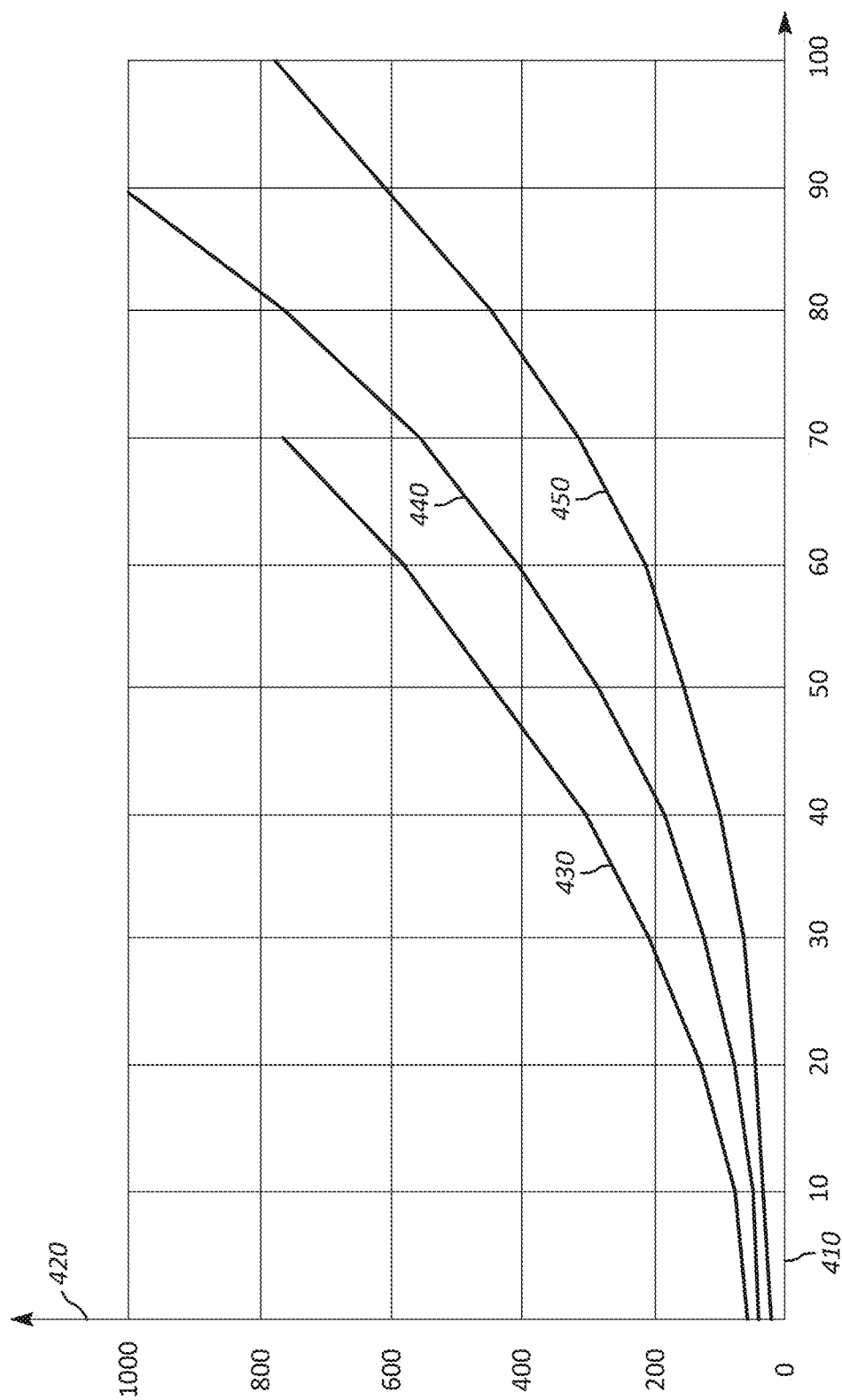
FIG. 4 illustrates a graph of a series of curves that show changes in vaporization pressure versus temperature for three different compounds, in accordance with various aspects of the subject technology.

FIG. 4 illustrates a graph of a series of curves that show changes in vaporization pressure versus temperature for three different compounds. FIG. 4 includes a horizontal axis 410 of temperature in degrees Celsius (C) and a vertical axis 420 of vaporization pressure. Curve 430 shows vaporization pressure versus temperature for n-Hexane, curve 440 shows vaporization pressure versus temperature for Benzene, and Curve 450 shows vaporization pressure versus temperature for n-Heptane. Note that each of the curves are non-linear. Because of these non-linear vaporization pressure to temperature curves, differences in conditions of a gas chromatograph may result in differences in retention times for different compounds changing relative to each other in non-linear ways.

Figure 5:
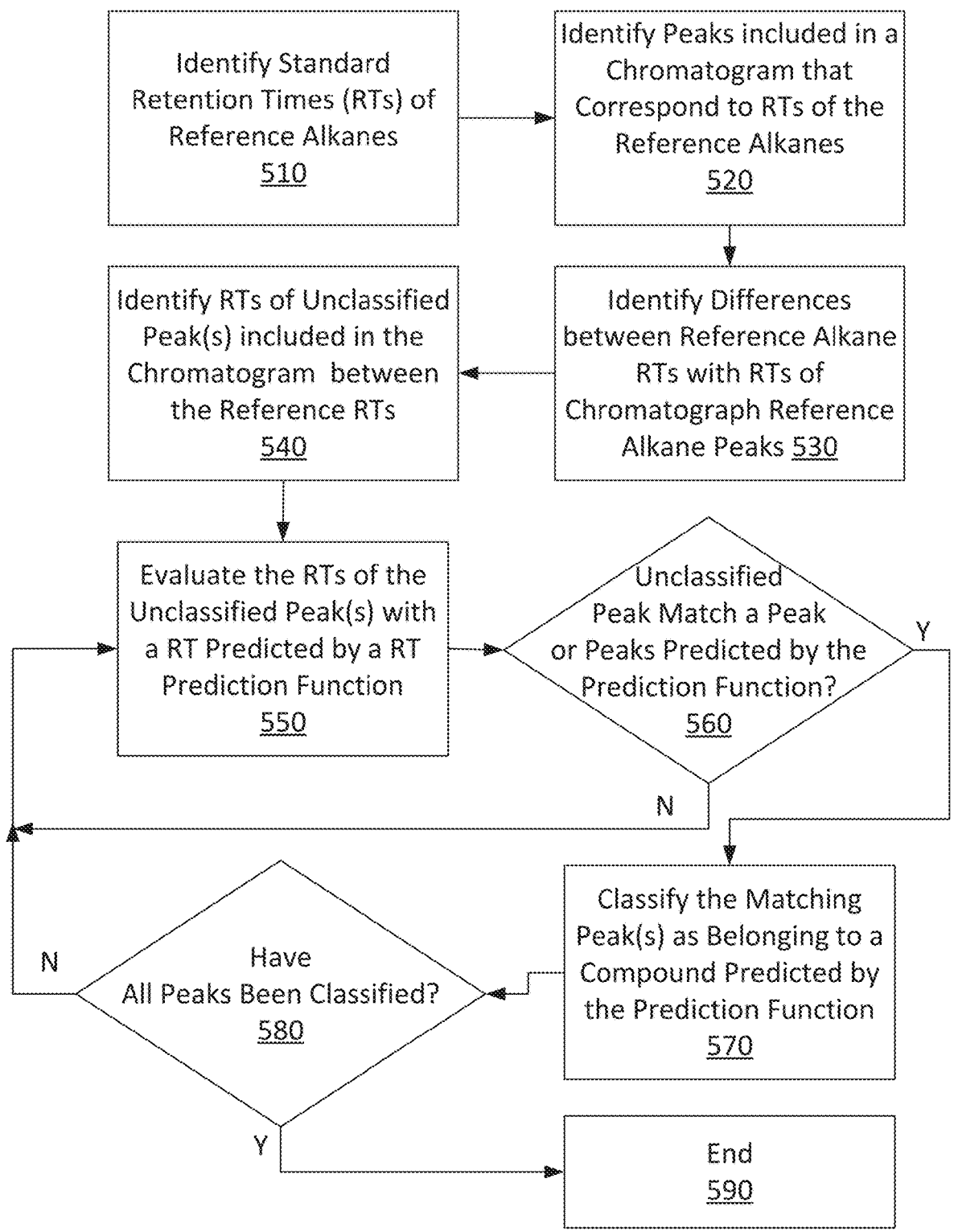
FIG. 5 illustrates a flowchart of an example process for identifying compounds associated with unclassified compounds included in a chromatogram, in accordance with various aspects of the subject technology, in accordance with various aspects of the subject technology.

FIG. 5 is a flowchart illustrating another example process for improving the operation of a gas chromatograph. Retention times of reference alkanes may be identified at block 510. Here again, the reference retention times may be associated with n-Hexane and n-Heptane and these times may correspond data provided by the NIST standard or database, or this data may correspond to other sets of reference data. The data accessed at block 510 may include data that identifies a standard retention time of a n-Hexane (a first reference compound), a standard retention time of a n-Heptane (a second reference compound), and standard retention times of one or more other known compounds. In such an instance, n-Hexane and n-Heptane may respectively be the reference compounds discussed in respect to FIG. 3.

At block 520 peaks included in a chromatogram that correspond to the reference alkanes (e.g., n-Hexane and n-Heptane) may be identified. Given the fact that variations in temperature, pressure, or other factors may cause measured retention times of compounds in a given gas chromatograph test to shift, measured retention times of compounds, including reference compounds, may be different than the standard retention times listed in an NIST database. Given such variations, retention times of specific compounds may vary from run to run, so even in instances when reference retention times are identified based on previous tests performed by a particular gas chromatograph, retention times for compounds detected in a current run of that gas chromatograph may change. Given this, a first peak included in the gas chromatograph may be identified as being (corresponding to) the first reference alkane (n-Hexane) and a second peak included in the gas chromatograph may be identified as being (corresponding to) the second reference alkane (n-Heptane).

Differences between the standard or reference alkane retention times and the measured retention times included in the chromatogram may be identified at block 530. This may include subtracting a value of a standard retention time of n-Hexane from a measured retention time of a peak in the chromatogram that is attributed to n-Hexane. This may also include subtracting a value of a standard retention time of n-Heptane from a measured retention time of a peak in the chromatogram that is attributed to n-Heptane.

Measured retention times of one or more unclassified peaks included in the chromatogram between the reference retention times may be identified at block 540. For example, a peak lying between peaks attributed to n-Hexane and n-Heptane could be based on the presence of Benzene in a sample used to generate the chromatogram. The retention times of the one or more unclassified peaks may be evaluated to see if shifts of the unclassified peaks correspond to a prediction function at block 550. For example, all peaks in a given chromatogram may be shifted to the left as compared to standard retention times because of an increase in temperature or reduction in pressure or other factors. More complex shifts could also be associated with the given chromatogram, for example, a ramp in temperature may result in a measured retention time of n-Hexane shifting to the right when a measured retention time of n-Heptane shifts to the left. Note, retention times that shift to the left correspond to shorter relative retention times and retention times that shift to the right correspond to longer relative retention times. The process of associating peaks included in a chromatogram with specific compounds may include selecting one or more prediction functions such as any of the functions identified earlier (e.g., a Kovats index function, a Van Der Dool and Kratz index function, and/or a regression algorithm function) or other functions and then applying those selected functions to a dataset.

Determination step 560 may identify whether a retention time of any of the one or more unclassified peaks matches (corresponds to) retention times predicted by a retention time prediction function. Estimates or predictions of retention times may correspond to changes in conditions of a gas chromatograph. As mentioned in respect to FIG. 3, such estimates or predictions may be based on a polarity of the liquid phase material or of a sample, a temperature of the sample, a temperature at a gas chromatograph, a temperature change or ramp, a pressure, and/or a pressure change or ramp. In certain instances, such temperatures, pressures, or polarity may be monitored by sensors at the gas chromatograph.

When one or more matches are identified, program flow may move to block 570 where any of the matching peaks are classified as being belonging to respective known compounds predicted by the prediction function. In certain instances, all peaks included between the two reference retention times may be classified using a single prediction function. In other instances, additional prediction functions may be used to identify any remaining unclassified peaks included in the chromatogram. When none of the unclassified peaks match the peaks predicted by the prediction function, program flow may move to block 550 where another prediction function may be used to evaluate the unclassified peaks. Determination block 580 may identify whether all peaks included in the gas chromatograph have been classified, when no program flow may move back to block 550 where another prediction function may be used to evaluate the unclassified peaks. When all of the peaks included in the chromatogram are classified or when all classifications functions have been evaluated, program flow may move to block 590, where the flow chart of FIG. 5 ends. In certain instances, a percentage of peaks included in a chromatogram may be expected to have retention times that are within a threshold level of predicted retention times when evaluations are performed. For example, a rule may specify that 90% of all peaks that appear in a chromatogram must be predicted within a threshold time difference to certify the accuracy of a particular prediction function.

Figure 6:
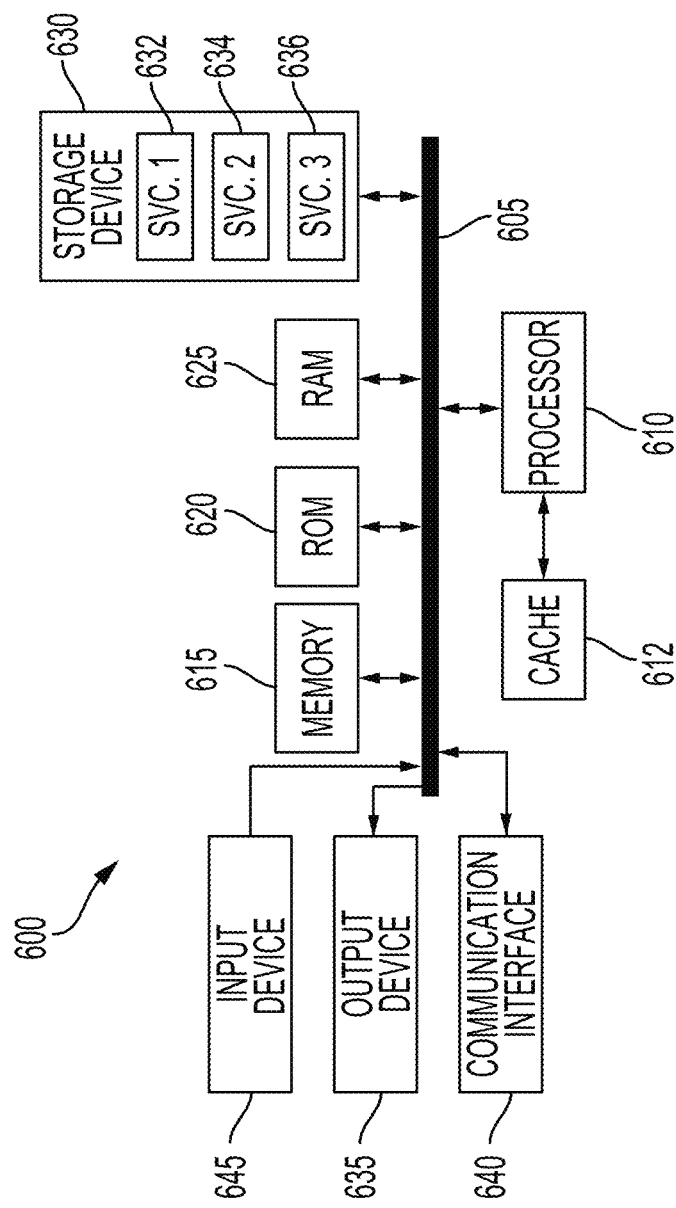
FIG. 6 illustrates an example computing device architecture which can be employed to perform various steps, methods, and techniques disclosed herein.

FIG. 6 illustrates an example computing device architecture 600 which can be employed to perform any of the systems and techniques described herein. In some examples, the computing device architecture can be integrated with the electromagnetic imager tools described herein. Further, the computing device can be configured to implement the techniques of controlling borehole image blending through machine learning described herein.

The components of the computing device architecture 600 are shown in electrical communication with each other using a connection 605, such as a bus. The example computing device architecture 600 includes a processing unit (CPU or processor) 610 and a computing device connection 605 that couples various computing device components including the computing device memory 615, such as read only memory (ROM) 620 and random access memory (RAM) 625, to the processor 610.

The computing device architecture 600 can include a cache of high-speed memory connected directly with, in close proximity to, or integrated as part of the processor 610. The computing device architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other computing device memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the processor design. The processor 610 may be a self-contained system, containing multiple cores or processors, a bus, memory controller, cache, etc. A multi-core processor may be symmetric or asymmetric.

To enable user interaction with the computing device architecture 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art, such as a display, projector, television, speaker device, etc. In some instances, multimodal computing devices can enable a user to provide multiple types of input to communicate with the computing device architecture 600. The communications interface 640 can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. The storage device 630 can include services 632, 634, 636 for controlling the processor 610. Other hardware or software modules are contemplated. The storage device 630 can be connected to the computing device connection 605. In one aspect, a hardware module that performs a particular function can include the software component stored in a computer-readable medium in connection with the necessary hardware components, such as the processor 610, connection 605, output device 635, and so forth, to carry out the function.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Aspects of the disclosure include:

Aspect 1: A method comprising accessing a database that stores data that identifies: a first standard retention time of a first reference compound, a second standard retention time of a second reference compound, and a third standard retention time of a known compound. This method may also include identifying a first peak in a chromatogram that corresponds to a measured retention time of the first reference compound; identifying a second peak in the chromatogram that corresponds to a measured retention time of the second reference compound; and determining a set of retention time differences that include differences between: the first standard retention time and the measured retention time of the first reference compound, and the second standard retention time and the measured retention time of the second reference compound. The method may also include identifying a measured retention time of an unclassified peak included in the chromatogram; identifying a predicted retention time of the known compound based on the determined set of retention time differences; identifying that a difference in the predicted retention time of the known compound and the measured retention time of the unclassified peak is within a prediction threshold; and classifying the unclassified peak as belonging to the known compound based on the identification that the difference in the predicted retention time of the known compound and the measured retention time of the unclassified peak being within the prediction threshold.

Aspect 2: The method of Aspect 1, further comprising identifying a prediction function based on the set of retention time differences; and applying the prediction function to identify the predicted retention time of the known compound.

Aspect 3: The method of any of Aspects 1 to 2 further comprising performing an evaluation that compares the retention time of the unclassified peak with the predicted retention time of the known compound to identify the prediction function.

Aspect 4: The method of any of Aspects 1 to 3, wherein the reference compounds are n-Hexane and n-Heptane.

Aspect 5: The method of any of Aspects 1 to 4, wherein the reference compounds are n-Hexane and n-Heptane and the retention time of the unclassified peak is greater than a retention time attributed to n-Hexane and is less than a retention time attributed to n-Hexane.

Aspect 6: The method of any of Aspects 1 to 5, wherein respective molecules of each of the reference compounds include between six and eight carbon atoms.

Aspect 7: The method of method of any of Aspects 1 to 6, further comprising applying a prediction function associated with a ramp in temperature.

Aspect 8: The method of any of Aspects 1 to 7, further comprising applying a prediction function associated with a polarity of a gas chromatograph column.

Aspect 9: The method of any of Aspects 1 to 8, further comprising applying a prediction function associated with a ramp in pressure.

Aspect 10, The method of any of Aspects 1 to 9, further comprising identifying measured retention times associated with one or more other known compounds, wherein the one or more other known compounds are respectively associated with one or more additional peaks included in the chromatogram. Aspect 10 may also include applying a plurality of different prediction functions to identify the predicted retention time of the known compound and to identify predicted retention times of the one or more other known compounds; and selecting a prediction function of the plurality of prediction functions based on: the identified difference in the predicted retention time of the known compound and the measured retention time of the unclassified peak being within the prediction threshold, and identified differences in predicted retention times of the one or more other known compounds and the measured retention times associated with the one or more additional peaks being within the prediction threshold.

Aspect 11: A non-transitory computer-readable storage medium having embodied thereon instructions executable by one or more processors for implementing a method comprising accessing a database that stores data that identifies: a first standard retention time of a first reference compound, a second standard retention time of a second reference compound, and a third standard retention time of a known compound. The one or more processors may also execute instructions to identify a first peak in a chromatogram that corresponds to a measured retention time of the first reference compound, identify a second peak in the chromatogram that corresponds to a measured retention time of the second reference compound; and determine a set of retention time differences that include differences between: the first standard retention time and the measured retention time of the first reference compound, and the second standard retention time and the measured retention time of the second reference compound. The one or more processors may also execute instructions to identify a measured retention time of an unclassified peak included in the chromatogram; identify a predicted retention time of the known compound based on the determined set of retention time differences; identify that a difference in the predicted retention time of the known compound and the measured retention time of the unclassified peak is within a prediction threshold; and classify the unclassified peak as belonging to the known compound based on the identification that the difference in the predicted retention time of the known compound and the measured retention time of the unclassified peak being within the prediction threshold.

Aspect 12: The non-transitory computer-readable storage medium of Aspect 11, the instructions further executable by the one or more processors to identify a prediction function based on the set of retention time differences; and apply the prediction function to identify the predicted retention time of the known compound.

Aspect 13: The non-transitory computer-readable storage medium of any of aspects 11 to 12, the instructions further executable by the one or more processors to perform an evaluation that compares the retention time of the unclassified peak with the predicted retention time of the known compound to identify the prediction function.

Aspect 14: The non-transitory computer-readable storage medium of any of aspects 11 to 13, wherein the reference compounds are n-Hexane and n-Heptane.

Aspect 15: The non-transitory computer-readable storage medium of any of aspects 11 to 14, wherein the reference compounds are n-Hexane and n-Heptane and the retention time of the unclassified peak is greater than a retention time attributed to n-Hexane and is less than a retention time attributed to n-Hexane.

Aspect 16: The non-transitory computer-readable storage medium of any of aspects 11 to 15, wherein respective molecules of each of the reference compounds include between six and eight carbon atoms.

Aspect 17: The non-transitory computer-readable storage medium of any of aspects 11 to 16, the instructions further executable by the one or more processors to apply a prediction function associated with a ramp in temperature.

Aspect 18: The non-transitory computer-readable storage medium of any of aspects 11 to 17, the instructions further executable by the one or more processors to apply a prediction function associated with a polarity of a gas chromatograph column.

Aspect 19: The non-transitory computer-readable storage medium of any of aspects 11 to 18, the instructions further executable by the one or more processors to apply a prediction function associated with a ramp in pressure.

Aspect 20: An apparatus for improving operation of a gas chromatograph, the apparatus comprising a memory; and one or more processors that execute instructions out of the memory to access a database that stores data that identifies: a first standard retention time of a first reference compound, a second standard retention time of a second reference compound, and a third standard retention time of a known compound. The one or more processors may also execute instructions out of the memory to identify a first peak in a chromatogram that corresponds to a measured retention time of the first reference compound identify a second peak in the chromatogram that corresponds to a measured retention time of the second reference compound; and determine a set of retention time differences that include differences between: the first standard retention time and the measured retention time of the first reference compound, and the second standard retention time and the measured retention time of the second reference compound. The one or more processors may also execute instructions out of the memory to identify a measured retention time of an unclassified peak included in the chromatogram; identify a predicted retention time of the known compound based on the determined set of retention time differences; identify that a difference in the predicted retention time of the known compound and the measured retention time of the unclassified peak is within a prediction threshold; and classify the unclassified peak as belonging to the known compound based on the identification that the difference in the predicted retention time of the known compound and the measured retention time of the unclassified peak being within the prediction threshold.

What is claimed is:

1. A method comprising:
   accessing a database that stores data that identifies:
   a first standard retention time of a first reference compound,
   a second standard retention time of a second reference compound, and
   a third standard retention time of a known compound;
   identifying a first peak in a chromatogram that corresponds to a measured retention time of the first reference compound;
   identifying a second peak in the chromatogram that corresponds to a measured retention time of the second reference compound;
   determining a set of retention time differences that include differences between:
   the first standard retention time and the measured retention time of the first reference compound, and
   the second standard retention time and the measured retention time of the second reference compound;
   identifying a measured retention time of an unclassified peak included in the chromatogram;
   identifying a predicted retention time of the known compound based on the determined set of retention time differences;
   identifying that a difference in the predicted retention time of the known compound and the measured retention time of the unclassified peak is within a prediction threshold; and
   classifying the unclassified peak as belonging to the known compound based on the identification that the difference in the predicted retention time of the known compound and the measured retention time of the unclassified peak being within the prediction threshold.

2. The method of claim 1, further comprising:
   receiving data sensed by a chromatograph, wherein the first peak, the second peak, and the third peak in the chromatogram are identified based on an evaluation of the data sensed by the chromatograph;
   identifying a prediction function based on the set of retention time differences; and
   applying the prediction function to identify the predicted retention time of the known compound.

3. The method of claim 2, further comprising:
   performing an evaluation that compares the retention time of the unclassified peak with the predicted retention time of the known compound to identify the prediction function.

4. The method of claim 1, wherein the reference compounds are n-Hexane and n-Heptane.

5. The method of claim 1, wherein the reference compounds are n-Hexane and n-Heptane and the retention time of the unclassified peak is greater than a retention time attributed to n-Hexane and is less than a retention time attributed to n-Hexane.

6. The method of claim 1, wherein respective molecules of each of the reference compounds include between six and eight carbon atoms.

7. The method of claim 1, further comprising:
   applying a prediction function associated with a ramp in temperature.

8. The method of claim 1, further comprising:
   applying a prediction function associated with a polarity of a chromatograph column.

9. The method of claim 1, further comprising:
   applying a prediction function associated with a ramp in pressure.

10. The method of claim 1, further comprising:
identifying measured retention times associated with one or more other known compounds, wherein the one or more other known compounds are respectively associated with one or more additional peaks included in the chromatogram;
applying a plurality of different prediction functions to identify the predicted retention time of the known compound and to identify predicted retention times of the one or more other known compounds; and
selecting a prediction function of the plurality of prediction functions based on:
the identified difference in the predicted retention time of the known compound and the measured retention time of the unclassified peak being within the prediction threshold, and
identified differences in predicted retention times of the one or more other known compounds and the measured retention times associated with the one or more additional peaks being within the prediction threshold.

11. A non-transitory computer-readable storage medium having embodied thereon instructions executable by one or more processors for implementing a method comprising:
accessing a database that stores data that identifies:
a first standard retention time of a first reference compound,
a second standard retention time of a second reference compound, and
a third standard retention time of a known compound;
identifying a first peak in a chromatogram that corresponds to a measured retention time of the first reference compound;
identifying a second peak in the chromatogram that corresponds to a measured retention time of the second reference compound;
determining a set of retention time differences that include differences between:
the first standard retention time and the measured retention time of the first reference compound, and
the second standard retention time and the measured retention time of the second reference compound;
identifying a measured retention time of an unclassified peak included in the chromatogram;
identifying a predicted retention time of the known compound based on the determined set of retention time differences;
identifying that a difference in the predicted retention time of the known compound and the measured retention time of the unclassified peak is within a prediction threshold; and
classifying the unclassified peak as belonging to the known compound based on the identification that the difference in the predicted retention time of the known compound and the measured retention time of the unclassified peak being within the prediction threshold.

12. The non-transitory computer-readable storage medium of claim 11, the instructions further executable by the one or more processors to:
receive data sensed by a chromatograph, wherein the first peak, the second peak, and the third peak in the chromatogram are identified based on an evaluation of the data sensed by the chromatograph;
identify a prediction function based on the set of retention time differences; and
apply the prediction function to identify the predicted retention time of the known compound.

13. The non-transitory computer-readable storage medium of claim 12, the instructions further executable by the one or more processors to:
perform an evaluation that compares the retention time of the unclassified peak with the predicted retention time of the known compound to identify the prediction function.

14. The non-transitory computer-readable storage medium of claim 11, wherein the reference compounds are n-Hexane and n-Heptane.

15. The non-transitory computer-readable storage medium of claim 11, wherein the reference compounds are n-Hexane and n-Heptane and the retention time of the unclassified peak is greater than a retention time attributed to n-Hexane and is less than a retention time attributed to n-Hexane.

16. The non-transitory computer-readable storage medium of claim 11, wherein respective molecules of each of the reference compounds include between six and eight carbon atoms.

17. The non-transitory computer-readable storage medium of claim 11, the instructions further executable by the one or more processors to:
apply a prediction function associated with a ramp in temperature.

18. The non-transitory computer-readable storage medium of claim 11, the instructions further executable by the one or more processors to:
apply a prediction function associated with a polarity of a chromatograph column.

19. The non-transitory computer-readable storage medium of claim 11, the instructions further executable by the one or more processors to:
apply a prediction function associated with a ramp in pressure.

20. An apparatus for improving operation of a chromatograph, the apparatus comprising:
a memory; and
one or more processors that execute instructions out of the memory to:
access a database that stores data that identifies:
a first standard retention time of a first reference compound,
a second standard retention time of a second reference compound, and
a third standard retention time of a known compound;
identify a first peak in a chromatogram that corresponds to a measured retention time of the first reference compound;
identify a second peak in the chromatogram that corresponds to a measured retention time of the second reference compound;
determine a set of retention time differences that include differences between:
the first standard retention time and the measured retention time of the first reference compound, and
the second standard retention time and the measured retention time of the second reference compound;
identify a measured retention time of an unclassified peak included in the chromatogram;
identify a predicted retention time of the known compound based on the determined set of retention time differences;

identify that a difference in the predicted retention time of the known compound and the measured retention time of the unclassified peak is within a prediction threshold; and classify the unclassified peak as belonging to the known compound based on the identification that the difference in the predicted retention time of the known compound and the measured retention time of the unclassified peak being within the prediction threshold.

* * * * *